June 28, 1960

D. R. CHURCH 2,942,613

CONTROLLING THE DRAIN OR FILL RATE OF CONTAINERS

Filed Feb. 12, 1959

INVENTOR.
DONALD R. CHURCH
BY James and Franklin
ATTORNEYS

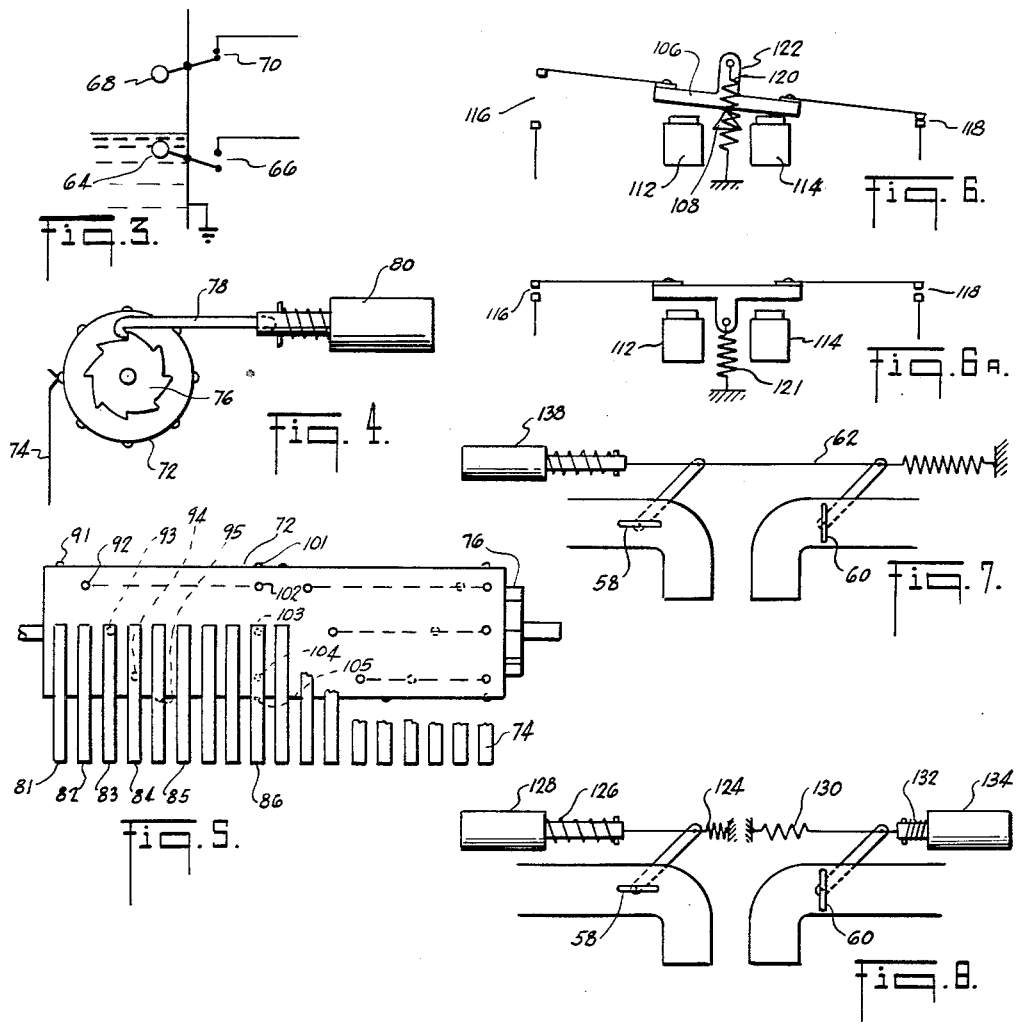

June 28, 1960
D. R. CHURCH
2,942,613
CONTROLLING THE DRAIN OR FILL RATE OF CONTAINERS
Filed Feb. 12, 1959
3 Sheets-Sheet 3
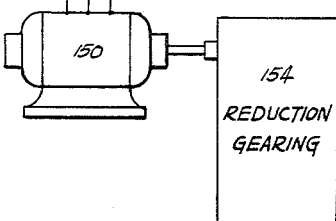
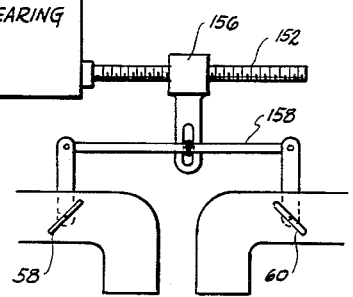
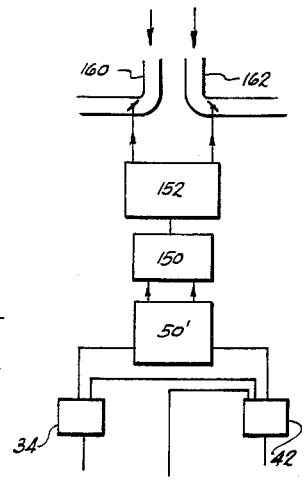
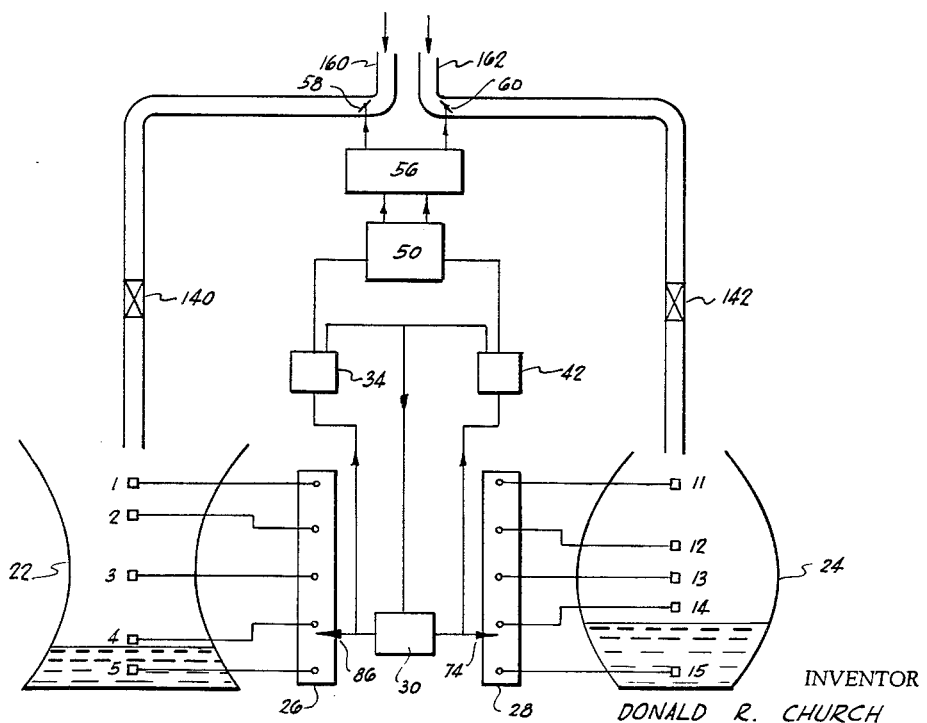
INVENTOR
DONALD R. CHURCH
BY *James and Franklin*
ATTORNEYS United States Patent Office 2,942,613
Patented June 28, 1960

2,942,613

CONTROLLING THE DRAIN OR FILL RATE OF CONTAINERS

Donald R. Church, East Northport, N.Y., assignor to Acoustica Associates, Inc., Long Island City, N.Y., a corporation of New York Filed Feb. 12, 1959, Ser. No. 792,878

8 Claims. (Cl. 137—101.21)

This invention relates to control of the relative drain or fill rates of containers, and more particularly to maintaining a desired quantitative relation between the changing contents of two tanks which may be very different in size and shape.

The primary object of the present invention is to generally improve apparatus for the specified purpose.

A more particular object is to provide an apparatus which uses a plurality of liquid level sensors located at discrete positions in or on the tanks, that is, point sensors rather than continuous level measuring devices.

To accomplish the foregoing general objects, and other more specific objects which will hereinafter appear, my invention resides in the apparatus elements and their relation one to another, as are hereinafter more particularly described in the following specification. The specification is accompanied by drawings in which:

Fig. 3 shows a simple float switch which may be used as a point sensor;

Fig. 4 is an end view of a stepping switch;

Fig. 5 is a front elevation of the stepping switch;

Fig. 6 represents a simple form of trigger device, which in this case is a double armature, double magnet relay;

Fig. 6A shows a modified trigger device;

Fig. 7 shows a solenoid operated valve control means using a single solenoid for two valves;

Fig. 8 is a similar view showing a valve control means using two solenoids for two valves;

Fig. 9 is a similar view showing a solenoid operating a single valve;

Fig. 10 shows a reversible integrating means and valve control, using a reversible motor;

Fig. 11 shows apparatus generally like that shown in Fig. 1, but applied to the filling rather than the draining of containers; and Fig. 12 shows a part of Fig. 11 modified like Fig. 2 to provide integrating means.

Figure 1:
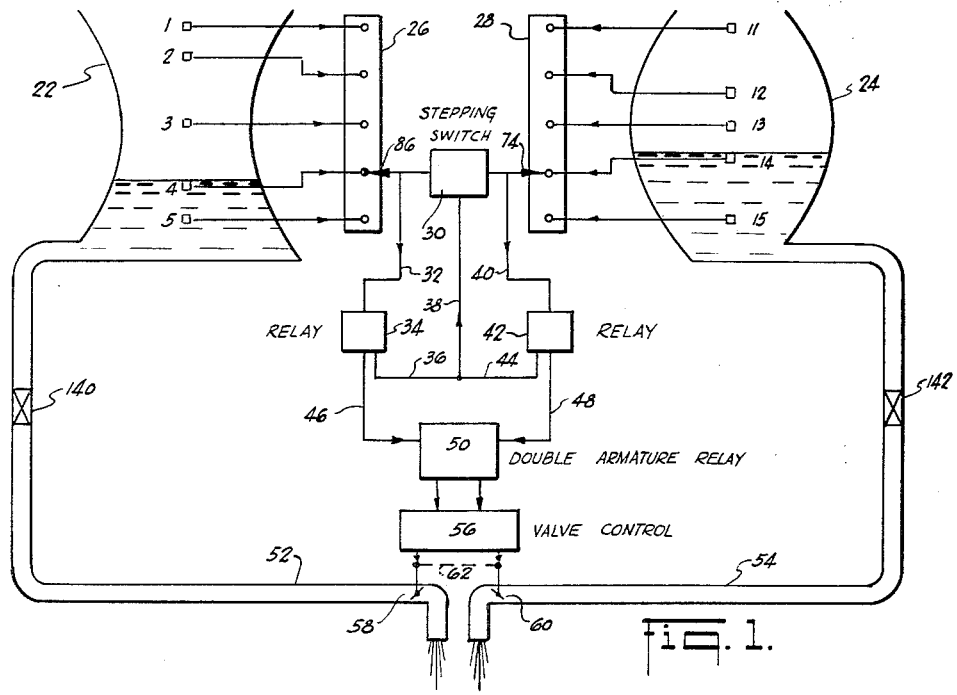
Fig. 1 is a schematic diagram explanatory of one form of my invention.

Referring to the drawing, and more particularly to Fig. 1, I there show schematically a first container or tank 22, and a second container or tank 24, which tanks are to be drained at rates which will empty them proportionally. While here shown about the same in size, they may differ very greatly in size, so that if one tank is, say three or four times the size of the other, its drain rate is to be three or four times as fast. Moreover, the tanks may differ greatly in shape as well as size, and to illustrate this the tank 22 is shown wide at the top and bottom and narrow at the middle, while the tank 24 is shown convex or barrel shaped.

The apparatus comprises a plurality of pairs of mating liquid level sensors. Thus the tank 22 has liquid level sensors or point sensors 1, 2, 3, 4 and 5, while the tank 24 has corresponding or matching point sensors 11, 12, 13, 14 and 15. The sensors of each pair are located in the containers at the desired relative heights intended to be simultaneously reached. In the present case, because of the concave configuration of tank 22 and the convex configuration of tank 24, the sensor 2 is higher than the sensor 12, and the sensor 4 is lower than the sensor 14. If both tanks were upright cylinders, the sensors could be uniformly spaced, but in any case whether their spacing be uniform or non-uniform, the relative height of the sensors in each pair is selected to conform to the desired drain rate.

The sensors of tank 22 are connected to a stepping switch or matrix 26, while the sensors of tank 24 are connected to a symmetrical stepping switch or matrix 28. These are moved simultaneously, as is indicated by their common control element 30 which functions to make the pairs of sensors effective successively. The means 30 responds to either sensor of a pair. Thus, in the present case where the liquid level is dropping to the region of sensor 4 or 14, the response of either sensor 4 or 14 will cause the stepping switch to move down to the next lower sensors 5 and 15. The connection for this purpose may include a detection device or a relay, in which case the flow in Fig. 1 for tank 22 is by way of conductor 32, detector or relay 34, and conductors 36, 38, or relay 42 and conductors 44, 38.

The relays 34 and 42 are also connected by conductors 46 and 48 to what may be termed a trigger means 50. This responds differentially to the relays (or in effect to the sensors of the effective pair), and the trigger means 50 then operates a valve control means 56 which so varies the relative flow rates through the drain pipes 52 and 54 as to relatively reduce the flow from that tank whose sensor responds first. In the present case, the valves are symbolically represented as butterfly valves at 58 and 60, and these are linked at 62 in such fashion that one valve opens as the other closes and vice versa.

The liquid level sensors may be of any desired type, and an example is shown in Fig. 3 in which a sensor comprises a float 64 controlling contacts 66. In the presence of liquid, the float rises and the contacts open as shown at 66, whereas in the absence of liquid the float falls as shown at 68, thereby closing its contacts 70.

The stepping switch matrices may take a variety of forms, and in the present case one usable form is illustrated in Figs. 4 and 5 of the drawing. In Fig. 4 it will be seen that there is a contact drum 72 engaged by a plurality of spring contacts or brushes, one of which is shown at 74. The drum is turned by a ratchet wheel 76 cooperating with a pawl 78 actuated by the plunger of a solenoid 80. The drum here has eight positions, although in Fig. 1 the number of sensors has, for simplicity, been reduced to five.

Referring now to Fig. 5, the sensors 1 through 5 may be connected respectively to spring brushes 81, 82, 83, etc. These cooperate respectively with contacts 91, 92, 93, etc. on the insulation drum 72. A collector brush 86 is connected to the conductor 32 shown in Fig. 1, and it cooperates with a series of contacts 101, 102, 103, etc. on the drum. Contacts 91 and 101 are connected to each other inside the drum; contacts 92 and 102 are connected to one another inside the drum, etc. With this arrangement the stepping switch makes one sensor effective, and makes all of the other sensors ineffective at any one time.

The remainder of the drum is a duplicate structure which takes care of the sensors 11 through 15 of the other tank, and the collector brush 74 is connected to the conductor 40 shown in Fig. 1.

The parts 34 and 42 shown in Fig. 1 may be conventional relays and may each be provided with two sets of contacts, one of which is wired to the solenoid of the stepping switch (80 in Fig. 4 which corresponds to 30 in Fig. 1) while the other is wired to the trigger means 50. The relays 34 and 42 therefore require no drawing, and it will be noted that in theory they could be omitted, because the stepping switch and the trigger means could be made responsive directly to the sensor circuit without the interposition of the relays.

The trigger means shown at 50 in Fig. 1 is schematically represented in Fig. 6. There is a double armature 106 pivoted at 108 and operated on by either magnet 112 related to tank 22, or magnet 114 related to tank 24. When magnet 112 is energized, the contacts at 116 are closed and the contacts at 118 are open, and vice versa when magnet 114 is energized. The armature remains in one position or the other, and may be provided with over-the-center resilient means here represented by a pull spring 120 connected to an arm 122. It will be evident that the contacts at 116 are closed when tank 22 is draining faster than tank 24, and the contacts at 118 are closed when tank 24 is draining faster than tank 22.

Referring now to Fig. 8, the butterfly valve 58 is biased to open position by means of a pull spring 124, or solenoid push spring 126, or both, and it is pulled to closed position when solenoid 128 is energized. Similarly, the valve 60 is biased to open position by springs 130 and 132, and is moved to closed position when solenoid 134 is energized as here shown. It will be understood that while the terms "open" and "closed" have been used, this is done in a relative sense, and in practice the valves are changed only partially rather than fully. It will also be understood that in relation to the trigger means shown in Fig. 6, the contacts at 116 would act to energize the solenoid 128, while the contacts at 118 have hereacted to energize the solenoid 134. Thus, only one or the other can be energized at one time, and the valves move oppositely in a corrective direction. The correction is a "jump" correction of fixed predetermined amount.

If the valves are mechanically connnected they may be operated by a single solenoid, and such an arrangement is shown in Fig. 7 in which valves 58 and 60 are connected by a link 62. They are operated by a solenoid 138, corresponding to the solenoid 128 in Fig. 8, and similarly controlled by the contacts at 116 in Fig. 6, but with this arrangement the contacts at 118 may be eliminated. The two magnets 112 and 114 are retained.

It is not essential to have two valves. Inasmuch as it is a relative flow that is being controlled, it is possible to let one flow remain unchanged, while the other is raised or lowered to correct for error in drain rate. Such an arrangement is shown in Fig. 9, in which the flow through pipe 54′ is unchanged, while the flow through pipe 52′ is controlled by valve 58′ and solenoid 138′.

In all cases the present control is for relative rate rather than absolute rate, and the latter may be either fixedly or variably adjusted by other means, here represented schematically in Fig. 1 by valves 140 and 142.

It will be understood that if the drain rates are exactly as desired, both sensors will respond simultaneously, and in such case the stepping switch (30 in Fig. 1 and 80 in Fig. 4) is advanced, but the trigger means 50 (or Fig. 6) will not change, and consequently there will be no change in the valves nor in the relative drain rate, which is as it should be.

Figure 2:
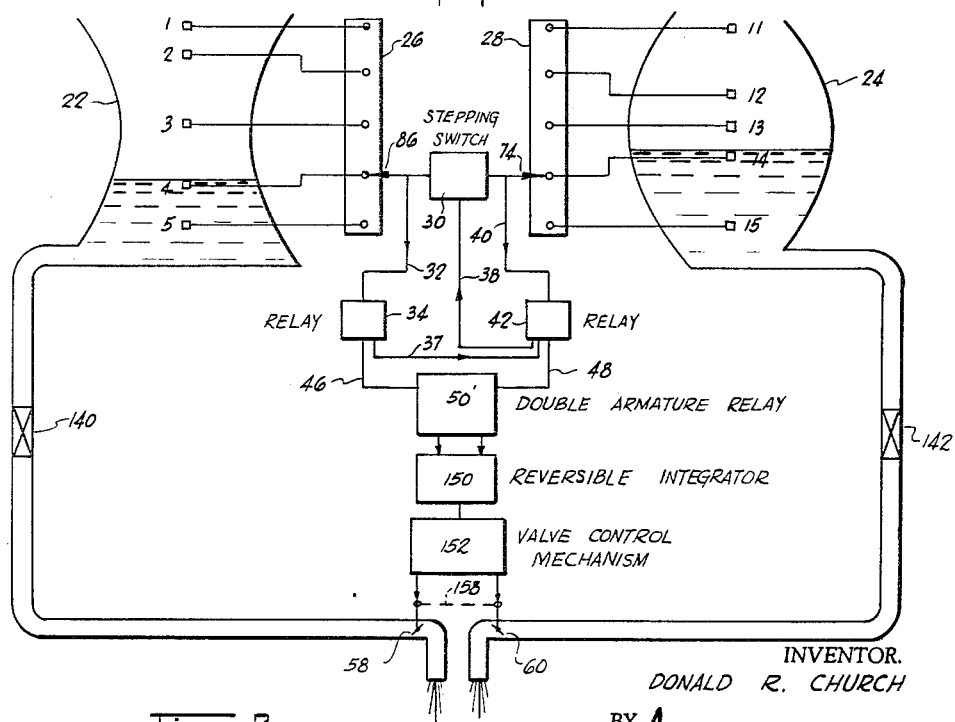
Fig. 2 is a similar diagram explanatory of a modified form in which the correction of flow rate is variable and is automatically changed to be proportional to the error in flow.

As so far described the correction is a fixed increment, and except for initial adjustment of the amount of correction, is unrelated to the degree of error in drain rate which may happen to take place. A more elaborate correction system is shown in Fig. 2, in which the amount of correction is variable and is made proportional to the amount of error. The amount of error is related to the time difference between the response of the first and second sensor in any one pair, it being obvious that a small time difference corresponds to a small error.

Referring to Fig. 2, similar numbers represent parts corresponding to those previously described. Thus, there is no change down through the relays 34 and 42. Their connection 37, 38 to the stepping switch 30 is in series instead of in parallel. The trigger means or double armature relay 50′ is modified to seek neutral or open position, instead of remaining closed on one side or the other. The trigger means 50′, instead of controlling the valves directly, now controls a reversible integrator 150, which is started in response to the first sensor, and then stopped in response to the second sensor of each pair, so that the amount of response is proportional to the error. The direction of response or integration is dependent on the direction of response of the trigger means 50′. The integrator 150 leads to a valve control mechanism 152 which in turn moves the valves 58 and 60 simultaneously and oppositely. Here again, the change is in that direction which reduces the rate of flow from that tank whose sensor responds first, but in the present case the amount of reduction is dependent on the amount of error.

A very simple form of integrator is that shown in Fig. 10, which is based on the use of a reversing motor 150. This drives reduction gearing 154 which turns a screw 152. The latter carries a nut 156 connected to a link 158 which in turn connects the valves 58 and 60. It will be seen that the valves are oppositely changed in a direction which depends on the direction of rotation of the motor, and that the amount of change will depend on the time during which the motor is operated, which in turn depends on the interval between the response of the first and second sensor of a pair.

Referring to Fig. 6A, the double armature relay or trigger means there shown does not have the over-the-center spring 120 of Fig. 6. Instead it is arranged to return to center or "open" position when neither magnet is energized and when both are energized. The first sensor then energizes one magnet and closes the contacts at one side, which starts the correction motor in proper direction, but when the second sensor of the pair is energized, the other magnet is energized, while the first magnet remains energized, and the armature is drawn to neutral or horizontal position, thus stopping the motor. The valves remain in position until the next sensor pair is reached.

The means to help restore the contacts to "open" condition is not shown in detail, but is here schematically symbolized by restoring or centering spring 121. The left conductor shown at the top of motor 150 in Fig. 10 may be connected to the left contacts in Fig. 6A; the right conductor of Fig. 10 to the right contacts of Fig. 6A, while center conductor of Fig. 10 is a common return. The motor includes a reversing switch, thrown one way or the other by the left or right connection.

It will be understood that the motor drive may be applied to a single valve, as shown in Fig. 9, instead of to two valves as shown in Fig. 10.

As another example of the invention, the correction system may use a fixed correction in the relative rates, in proper sense, as in Fig. 1, but that fixed correction is applied for a time duration which is proportional to the error as determined by the time difference between sensor signals. This system has about the same end accuracy as the system of Fig. 2, but does not offer as smooth a control. The relays 34 and 42 are connected in series as in Fig. 2, so that the stepping switch does not step until after response of the second sensor of each pair. The trigger is the centering relay of Fig. 6A, rather than the over-the-center relay of Fig. 6. The contacts are led to the solenoids as shown in Fig. 8. Both solenoids are normally deenergized, and both spouts are open. One flow or the other is slowed down by one solenoid or the other for a time proportional to the error.

Fig. 11 illustrates how the same apparatus elements and circuitry may be employed to control the fill rate instead of the drain rate of tanks. In this case a first liquid is supplied through a pipe 160, while a second liquid is supplied through a pipe 162. The absolute flow rates may be controlled by valves 140 and 142, while the relative flow rate is controlled by valves 58 and 60. The apparatus shown in Fig. 11 is of the simpler type corresponding to that shown in Fig. 1, that is, it provides a fixed change, without an integrator to vary the change proportionally to the amount of error.

The tanks 22 and 24 may vary greatly in dimension and in shape. The tanks are fitted with pairs of sensors again numbered 1, 2, 3, 4, 5, in tank 22, and 11, 12, 13, 14 and 15 in tank 24. These are connected to stepping switch matrices 26 and 28 actuated by suitable means 30, for example a solenoid as shown in Fig. 4. As before, the sensors may work through detectors or relays 34 and 42, and control a trigger means 50 such as the double armature relay shown in Fig. 6. This in turn energizes a valve control means 56, which may be like that shown in Fig. 7, or Fig. 8, or Fig. 9.

It will be recognized that the apparatus for controlling fill rate is identical to the apparatus for controlling drain rate, so much so that similar reference numerals have been applied.

The valve control means 56 shown in Fig. 11 may be replaced by the reversible integrator 150 and valve control mechanism 122 shown in Fig. 2. This is illustrated in Fig. 12 which corresponds to the upper middle part of Fig. 11, but shows a centering relay 50' and reversing motor 150, as in Fig. 2. The centering relay may be like that shown in Fig. 6A, and the integrator motor as in Fig. 10. These provide an amount of valve correction in the fill rate which is proportional to the amount of error in the filling of the tanks. The circuitry of Fig. 12 may also be used for a "jump" correction of variable time, as described four paragraphs before for Fig. 2.

In all forms of the invention the function of the liquid level sensor in the system is to generate a signal when the liquid surface passes a reference point on the sensor. These sensors may be mounted inside of the tanks, or on the outside wall of the tanks. The sensors may be of any type, such as thermistor, float switch, radioactive absorption, those based on acoustic impedance, or any of the other types available commercially. They should preferably be instantaneously acting, and should be accurate with regard to repeatability of point of actuation.

Pairs of liquid level sensors are located in positions such that under conditions of desired drain rates each sensor in one tank and its mating sensor in the other tank will be uncovered simultaneously. When the signals from the two tanks are not simultaneous, a correction in one or both of the tank drain rates is indicated. The drain rate of the tank from which the first sensor signal is received is decreased, or the drain rate of the tank from which the second signal is received is increased, or both. As each sensor-pair station in the tanks is passed an appropriate correction is applied to the relative drain rates, depending upon which sensor signal occurs first. The degree of accuracy obtainable with the system depends upon the number of sensor stations used, the type of correction system employed, and the maximum amount of error in the uncontrolled tank drain rates.

Since each sensor location represents the remaining tank volume at that station, the complexity of the tank shape does not influence the correction system. Neither does the tank size.

The electrical parts described above may be replaced by electronic circuitry. As the liquid levels drop past a sensor pair in the tanks, one of the sensors generates a signal first, and this signal is fed through detectors 34 and 42 to a trigger circuit 50. The trigger circuit actuates a valve control circuit 56 which makes an incremental change in the relative flow rates from the two tanks by means of changes in the settings of valves 58 and 60. If the tank 22 sensor signal is received first, the flow from tank 22 is decreased relative to the flow from tank 24, and vice versa. Actuation of trigger circuit 50 also operates a counter circuit 30 which steps the switching matrices 26, 28 to the next lower sensor pair. Then, when the liquid levels reach the next sensor pair the sequence described above repeats.

The correction system is that part of the system which converts the sensor signal information into corrections in the tank drain rates. A simple correction system is one in which a fixed change is made in the relative drain rates of the tanks, depending only upon which sensor signal is received first.

A more elaborate correction system is one which applies a valve correction which is proportional to the amount of error. The amount of error is determined by measuring the time difference between the signals from a pair of sensors. Then, assuming an average value of tank drain rates, the error is the product of the drain rate and the time difference.

Figure 2 is a diagram of a correction system which applies proportional corrections to the tank drain rates in accordance with the measured errors. Here again electronic circuitry may be used.

As the liquid levels drop below a sensor pair the first signal causes a gate circuit 50' to be turned on, which will energize a circuit 150. Circuit 150 may be either a counter or integration circuit which generates an output proportional to time. The polarity of the output of circuit 150 is a function of which sensor signal turns on the gate circuit 50'. When the second sensor signal is received it energizes its detector circuit 34 or 42 and this turns off gate circuit 50'. Circuit 150 then stops integrating, and its output is held at a value proportional to the time between the sensor signals. The valve control circuit 152 then responds to the output of integrator circuit 150 to move the valves 58 and 60. The change in the relative flow rates from the tanks is then proportional to the time difference between the sensor signals.

When gate circuit 50' is turned off by receipt of the second sensor signal it triggers counter circuit 30 which steps the switching matrices to the next set of sensors. When the liquid levels reach the next sensor pair the the above process is repeated, resulting in a new valve setting which again changes the relative flow rates an amount proportional to the time difference between the sensor signals.

The system of Fig. 2 may be made to compensate for programmed changes in the absolute flow rates from the tanks by the addition of an integration rate control circuit to circuit 150 so that the rate of signal build up from circuit 150 is controlled in accordance with the tank drain rates. In the motor example described above, this consists of a speed control for the motor.

It is believed that the apparatus for controlling the relative drain or fill rate of a plurality of tanks, as well as the advantages, thereof will be apparent from the foregoing description. It will also be apparent that while I have shown and described my invention in several preferred forms, changes may be made without departing from the scope of the invention as sought to be defined in the following claims. In the claims the reference to stepping the switch "in response to a sensor pair" is intended to apply to either the first sensor as in Figs. 1 and 11, or the second sensor as in Figs. 2 and 12.

I claim:

1. Apparatus for controlling the relative flow rate in conduits connected respectively to a plurality of tanks which tanks may differ greatly in size and shape, said apparatus comprising a plurality of pairs of mating liquid level sensors, one sensor of each pair being located on one tank and the other sensor on the other tank at the relative height desired to be simultaneously reached, stepping switch matrices to make the pairs effective successively, means to step the switch matrices in response to a sensor pair, a trigger means responsive differentially to sensors of a pair, and valve control means in at least one of said conduits to so vary the relative flow rates as to relatively reduce the flow in the conduit of that tank whose sensor responds first.

2. Apparatus for controlling the relative flow rate in conduits connected respectively to a plurality of tanks which tanks may differ greatly in size and shape, said apparatus comprising a plurality of pairs of mating liquid level sensors, one sensor of each pair being located on one tank and the other sensor on the other tank at the relative height desired to be simultaneously reached, stepping switch matrices to make the pairs effective successively and to make the other pairs ineffective, means to step the switch matrices in response to a sensor pair, a trigger means responsive differentially to sensors of a pair, and valve control means in at least one of said conduits to so vary the relative flow rates as to relatively reduce the flow in the conduit of that tank whose sensor responds first.

3. Apparatus for controlling the relative flow rate in conduits connected respectively to a plurality of tanks which tanks may differ greatly in size and shape, said apparatus comprising a plurality of pairs of mating liquid level sensors, one sensor of each pair being located on one tank and the other sensor on the other tank at the relative height desired to be simultaneously reached, stepping switch matrices to connect the pairs successively to detector units, means to step the switching matrices in response to a detector unit and sensor pair, a trigger means responsive differentially to the detector units, and valve control means in at least one of said conduits to so vary the relative flow rates as to relatively reduce the flow in the conduit of that tank whose sensor responds first.

4. Apparatus for controlling the relative flow rate in conduits connected respectively to a plurality of tanks which tanks may differ greatly in size and shape, said apparatus comprising a plurality of pairs of mating liquid level sensors, one sensor of each pair being located on one tank and the other sensor on the other tank at the relative height desired to be simultaneously reached, stepping switch matrices to make the pairs effective successively, means to step the switch matrices in response to the later sensor of a pair, a trigger means responsive differentially to the sensors of a pair, reversible integration means which is started in response to the first sensor and stopped in response to the second sensor of each pair, whereby the amount of correction is proportional to the error, the direction of integration being dependent on the direction of response of the trigger means, and valve control means in at least one of said conduits responsive to the reversible integration means to so vary the relative flow rate as to reduce the flow in the conduit of that tank whose sensor responds first, with the amount of reduction being dependent on the amount of error.

5. Apparatus for controlling the relative flow rate of conduits connected respectively to a plurality of tanks which tanks may differ greatly in size and shape, said apparatus comprising a plurality of pairs of mating liquid level sensors, one sensor of each pair being located on one tank and the other sensor on the other tank at the relative height desired to be simultaneously reached, stepping switch matrices to make the pairs effective successively and to make the other pair ineffective, means to step the switch matrices in response to the later sensor of a pair, a trigger means responsive differentially to the sensors of a pair, reversible integration means which is started in response to the first sensor and stopped in response to the second sensor of each pair, whereby the amount of correction is proportional to the error, the direction of integration being dependent on the direction of response of the trigger means, and valve control means in at least one of said conduits responsive to the reversible integration means to so vary the relative flow rate as to reduce the flow in the conduit of that tank whose sensor responds first, with the amount of reduction being dependent on the amount of error.

6. Apparatus for controlling the relative flow rate in conduits connected respectively to a plurality of tanks which tanks may differ greatly in size and shape, said apparatus comprising a plurality of pairs of mating liquid level sensors, one sensor of each pair being located on one tank and the other sensor on the other tank at the relative height desired to be simultaneously reached, stepping switch matrices to connect the pairs successively to detector units, means to step the switch matrices in response to a detector unit and sensor pair, a trigger means responsive differentially to the detectors, a reversible integration means which is started in response to the first detection and then stopped in response to the second detection whereby the amount of response is proportional to the error, the direction of integration being dependent on the direction of response of the trigger means, and valve control means in at least one of said conduits responsive to the reversible integration means to so vary the relative flow rate as to reduce the flow in the conduit of that tank whose sensor responds first, with the amount of reduction being dependent on the amount of error.

7. Apparatus for controlling the relative flow rate in conduits connected respectively to a plurality of tanks which tanks may differ greatly in size and shape, said apparatus comprising a plurality of pairs of mating liquid level sensors, one sensor of each pair being located on one tank and the other sensor on the other tank at the relative height desired to be simultaneously reached, stepping switch matrices to make the pairs effective successively, means to step the switch matrices in response to a sensor pair, a trigger means responsive differentially to the sensors of a pair, valve position correction means in at least one of said conduits which is operated in response to the first sensor and stopped in response to the second sensor of each pair, whereby the amount of correstion is proportional to the error, the direction of the valve change being dependent on the direction of response of the trigger means and being such as to reduce the flow in the conduit of that tank whose sensor responds first, with the amount of reduction being dependent on the amount of error.

8. Apparatus according to claim 4, comprising an integration rate control means operatively associated with said reversible integration means to control the rate of correction in accordance with desired flow rates in all of said conduits.

References Cited in the file of this patent

UNITED STATES PATENTS

| | | |
|---|---|---|
| 2,509,629 | De Giers | May 30, 1950 |
| 2,687,168 | Haviland | Aug. 24, 1954 |